United States Patent [19]

Siddall et al.

[11] 4,080,741
[45] Mar. 28, 1978

[54] MEASURING APPARATUS

[75] Inventors: Graham John Siddall, Keyworth; David Garratt, Hinckley, both of England

[73] Assignee: The Rank Organisation Limited, London, England

[21] Appl. No.: 603,582

[22] Filed: Aug. 11, 1975

[30] Foreign Application Priority Data

Aug. 7, 1974 United Kingdom ............... 34767/74

[51] Int. Cl.² .............................................. G01B 7/34
[52] U.S. Cl. ................................ 33/174 L; 33/178 E; 33/180 R
[58] Field of Search ............. 33/174 L, 174 Q, 174 R, 33/178 E, 174 P, 180 R, 1 M

[56] References Cited

U.S. PATENT DOCUMENTS 3,499,227  3/1970  Krause et al. ...................... 33/174 P
3,826,011  7/1974  D'Aniello ........................... 33/174 Q Primary Examiner—Richard E. Aegerter
Assistant Examiner—Willis Little
Attorney, Agent, or Firm—Brisebois & Kruger

[57] ABSTRACT

With stylus type measuring instruments for the measurement of surface roughness or form an improved method of setting up employs a reference body having a cylindrical or part-cylindrical surface. By probing the curved reference surface a datum point is established. The reference body is then moved by a predetermined amount with respect to this datum and acts as a secondary reference standard.

9 Claims, 4 Drawing Figures

MEASURING APPARATUS

The present invention relates to a method of determining radii, and is particularly suitable for use on spindle-type stylus instruments for surface measurement, such as roundness measurement instruments or surface form measurement instruments, of the type in which a component under test is supported on a table and traversed by a pick-up, the component and the pick-up being relatively rotatable about a fixed datum axis.

In instruments of this type the table may be fixed with respect to a machine bed and the pick-up rotatable about the datum axis, or alternatively the pick-up may be fixed and the table rotatable about the datum axis. It is known to provide the workpiece table of such an instrument with a rectilinearly movable slide which can be indexed by a suitable indexing mechanism, and the displacement of which, with respect to a datum position, can be measured. Roundness or surface form measurement instruments having such a rectilinearly movable slide carried by a workpiece table will be referred to hereinafter as instruments "of the type described".

In order to determine the radius of a component under test with great accuracy by comparator techniques it is necessary to use a reference body which, at given temperature conditions, has an accurately known radius. This is required because the pick-up of the surface measurement instrument has only a restricted range of movement and it is therefore necessary to set the radial position of the pick-up to a predetermined known value and add this known value to the output signal from the pick-up in order ultimately to determine the radius of the component under test. Since the pick-up has a very limited range of movement, if it was desired to determine the radii of components of various different sizes it was previously necessary to have available a wide range of reference bodies each different from one another by something less than the total range of movement of the pick-up.

One frequent use to which such roundness measurement instruments are placed is in the testing of components during manufacture in order to control the manufacturing process to produce products the dimensions of which are made within very fine tolerance limits. In such high precision engineering applications the instruments frequently perform long runs of operation using only a single reference body and the requirement for a large number of reference bodies is not felt. For a more general application, however, it is a considerable disadvantage to have to provide a large number of reference bodies and a method is required of setting the radial distance of a pick-up from the reference axis in order to determine the radius of a component of any size without requiring a reference body of substantially the same size in order to do so. This cannot be provided simply by means of a graduated scale on the support for the pick-up since the accuracy with which determinations must be made is such that an error greater than two thousandths of an inch is not tolerable.

According to the present invention a method of setting the pick-up of an instrument of the type described to a selected radial position comprises the steps of locating on the table a reference body having a cylindrical or part-cylindrical surface, centring the reference body on the table, adjusting the slide to move the reference body by a selected radial distance, adjusting the radial position of the pick-up until it contacts the surface of the reference body, rotating the body or the pick-up back and forth over a limited range to establish the relative angular position of the pick-up and the reference body corresponding to a turning point of the output signal from the pick-up, and further adjusting the radial position of the pick-up while effecting back and forth relative movement between the pick-up and the reference body, to adjust the value of the pick-up output at the turning point to a chosen value.

In instruments of the type described the means for indexing the slide may be of any known type including an arrangement of gauge blocks or slip blocks, or a micrometer head. Alternatively, an indexing screw may be used in conjunction with an analogue or digital displacement transducer.

By setting the pick-up in a predetermined position in relation to the reference body it is possible to determine the radial distance due to the fact that the reference body can be reasonably accurately centred with respect to the datum axis. The selected distance by which the slide is moved clearly must take into account the known radius of the reference body if the same curved surface of the reference body is used to establish accurately the selected position for the pick-up. The method may be performed, however, by using a closed semi-cylindrical reference body and, having centred the curved surface of the body with respect to the datum axis, with the pick-up in contact with the curved surface thereof, the pick-up is then moved to contact the flat face of the reference body prior to the said adjustment to bring it in contact with the reference body at the said selected position. Provided the centre of curvature of the curved surface of the semi-cylindrical body lies on the flat face thereof the total movement required of the indexing mechanism to move the pick-up from a position in contact with the flat face of the reference body when it is centred on the datum axis, to the position where it is in contact with the flat face at the selected position represents the total radial movement of the pick-up.

Preferably the instrument of the type described incorporates means for displaying the output of the pick-up on a chart and the further adjustments to the output of the pick-up are effected to move the pen or indicator of the chart display to a selected position thereon. That is, the chart display will indicate the minimum in the value of the pick-up output signal quite readily for an operator to adjust the position of the pick-up such that the minimum lies on the selected chart position.

The present invention also comprehends a method of determining the actual mean radius of a component, the nominal radius of which is known, using an instrument of the type described, comprising the steps of setting the radial distance of the pick-up to the nominal radius by a method as defined above, substituting the component under test for the reference body, traversing the pick-up in contact with the component under test, and determining the difference in the mean value of the output signal from the pick-up during the traverse from the said selected value thereof to provide an indication of the mean value of the radius of the component under test.

Instead of accurately centring the reference body this may be left roughly centred and an electronic computer used to compute the radius of the least square reference circle from the output signal of the pick-up when the pick-up is traversed around the roughly centred reference body. This information is then stored and added (or subtracted depending on the direction of displacement of the worktable) to the displacement of the worktable in establishing the radial setting of the pick-up. Circuits suitable for achieving this computation are described in British Application No. 36725/74.

As an alternative to using visual inspection of the display of the pick-up output to determine the turning point electronic sensing may be used. Again suitable circuits for effecting such sensing are described in British Application No. 36725/74.

The invention will now be more particularly described, by way of example, with reference to the accompanying drawings, in which.

Figure 1:
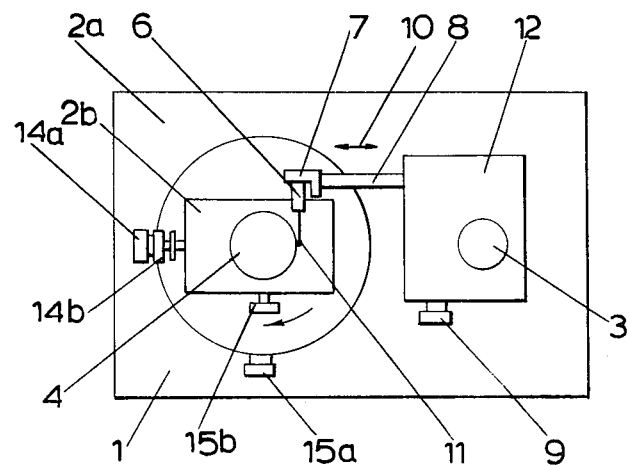
FIG. 1 is a plan view of a known form of roundness measuring instrument.

Referring now to FIG. 1, there is shown a roundness measurement instrument comprising a bed 1 on which is mounted a rotary table 2a on which there is mounted an XY co-ordinate table 2b. The table 2b carries means (not shown) for clamping a workpiece indicated 4 in FIG. 1, and 5 in FIG. 2, thereto for movement therewith. The rotary table 2a is carried for rotary movement about an axis A—A which forms the reference axis of the instrument, and the table 2a is adjustable over a limited range in two perpendicular directions by means of the knobs 14a and 15a. The XY co-ordinate table is movable over a greater range, by a movement which can be measured by suitable linear indexing means (not shown) under the control of adjusting knobs 14b, 15b.

Figure 2:
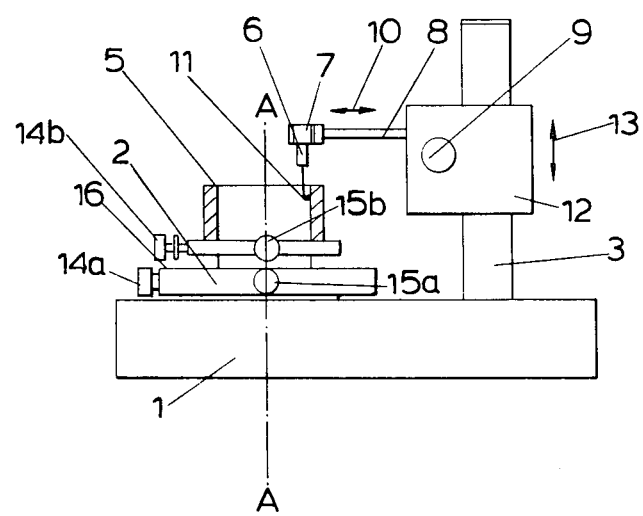
FIG. 2 is a side view of the instrument illustrated in FIG. 1 showing the pick-up support in an alternative configuration.

Also carried on the bed 1 is an upright column 3 vertically adjustable along which is a carriage 12 which carries a substantially horizontal pick-up support arm 8 the free end of which is provided with a bracket 7 from which projects a pick-up 6 having a stylus 11. The bracket 7 can be adjusted to one of two positions so that the pick-up 6 projects horizontally as in FIG. 1, or vertically as in FIG. 2. The arrangement shown in FIG. 1 is particularly suitable for the detection of the outside surfaces of cylindrical bodies, and the arrangement shown in FIG. 2 is particularly suited for the measurement of the internal curved surfaces of hollow cylindrical bodies.

Figure 3:
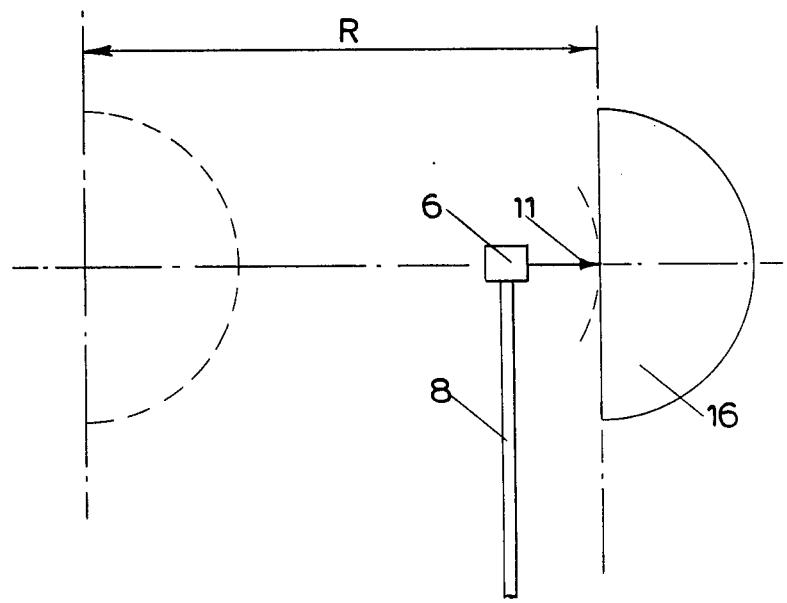
FIG. 3 is a schematic diagram illustrating the performance of the method of the invention utilising a semicylindrical reference body.
Figure 4:
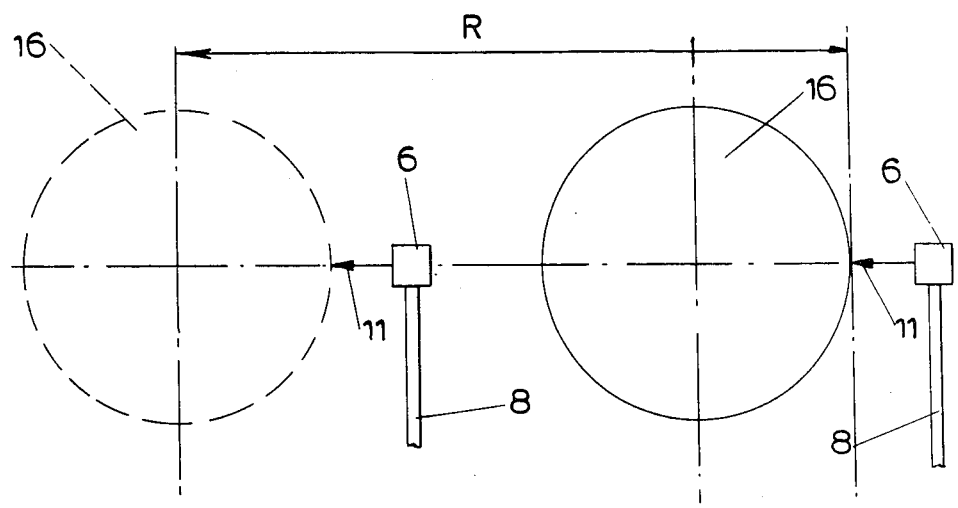
FIG. 4 is a schematic diagram illustrating the performance of the method utilising a circular reference body.

In performing the method of the present invention a semi-cylindrical reference body 16 is positioned on the co-ordinate table 2b and the stylus 11 of the pick-up 6 is moved into contact with the curved surface thereof. The table is then rotated about the reference axis A—A and adjustments made by means of the knobs 14a, 15a to centre the reference body with respect to the axis A—A, that is to adjust its lateral position, in the plane of the table 2, until the output from the pick-up 6 is constant, or as near constant as is practically possible. If the pick-up output is displayed on a linear chart this would be represented by a straight line: if displayed on a circular chart then a perfect semi-circle concentric to one of the premarked circles on the chart would be observed. When the reference body has been centred with respect on the datum axis A—A there are two alternative steps which may be taken in the further performance of the method; these two steps are shown in FIGS. 3 and 4 of the accompanying drawings. In FIG. 3 the stylus 11 is moved from its initial position in contact with the curved surface of the reference body 16 and the curved body 16 is displaced linearly, by operation of the adjusting knob 14b, in a radial direction relative to the datum axis of rotation of the instrument. The required adjustment to the indexing mechanism controlled by the knob 14b is recorded (initial and final positions) and the stylus 11 is brought into contact with the flat face of the reference body 16.

The table 2a is then moved angularly over a limited range to either side of the mid position while the output signals from the pick-up 6 are noted. As the stylus 11 traverses past the point in the flat face of the reference body 16 at which lies the centre of curvature of the curved surface, the output signal will reach a turning point. If the body was moved, as shown in FIG. 3, from the position indicated in broken outline to the position indicated in solid outline the pick-up 6 will produce a minimum turning point as the body is traversed past the mid position. The radial position of the pick-up 6 is adjusted until the turning point obtained by relative angular rotation over a limited range is located on a selected chart position. (When using a semi-cylindrical reference body the only requirement when centring on the curved surface is that the pick-up output is sensibly constant. It is not necessary at the centring stage to locate the recorder output on a known chart position). The reference body is then removed without altering the adjustment of the radial position of the pick-up 6, or the electrical adjustment of the pick-up output, if such is provided, and a component under test placed on the table 2 which is then centred in a known way. Since the radial separation of the pick-up from the datum axis A—A is fixed the centring must be carried out by adjusting the knobs 14a, 15a of the rotary table 2a until the output from the pick-up 6 is substantially constant and located on the selected chart position used when setting on the reference body, during a whole traverse of the pick-up with the reference body.

The method outlined above is suitable for setting the apparatus for measuring concave radii. To determine a convex radius it is not only necessary to adjust the reference body in the opposite direction from that shown in FIG. 3: the output signal from the pick-up 6 will, of course, in these circumstances produce a turning point in the opposite direction.

Instead of using a semi-cylindrical reference body a cylindrical reference body may be used with substantially the same method. This has advantages in that cylindrical reference bodies can be made with greater ease than semi-cylindrical reference bodies. As illustrated in FIG. 4 the reference body is first centred on the axis A—A with the stylus 11 of the pick-up 6 in contact with the surface thereof, and then displaced by the distance R, (which corresponds to the required setting, taking into consideration the diameter of the reference body) and the stylus repositioned to engage the surface of the reference body and further adjustments made to the position of the pick-up so that the position of the pen or indicator on the chart (if such is provided) is the same at the turning point as it was when centring the reference body. It is then assured that the pick-up has been moved by exactly the same distance as the worktable so that displacement of the pick-up can be established with the same accuracy as that of the worktable.

The method of the invention, when utilised with a semi-cylindrical reference body has the advantage that it is not necessary to know the radius of the reference body, the only geometrical requirement being that the curved surface should be sufficiently accurate and the axis of the curved surface should lie on the plane face.

We claim:

1. A method of setting the pick-up of an instrument of the type comprising:
    a workpiece support table,
    an X-Y coordinate table mounted on the support table,
    a pick-up on a pick-up support mounted with respect to said workpiece support table such that at least one of said pick-up and said workpiece support table are rotatable about a fixed datum axis of the instrument,
    adjustment means carried by said workpiece support table to rectilinearly displace said workpiece support table, and
    means for measuring displacements of said coorindate table with respect to said workpiece support table,
    whereby to position said pick-up at a selected radial position, said method comprises the steps of:
    locating on said X-Y coordinate table a reference body having an at least partly cylindrical surface,
    centering said reference body on said X-Y coordinate table with respect to said datum axis by causing said pick-up to traverse over the cylindrical surface of said reference body and adjusting said adjustment means of said workpiece support table until the pick-up output is substantially constant at a certain value,
    adjusting said X-Y coordinate table to displace said reference body by a selected distance away from said datum axis,
    adjusting the radial position of said pick-up until it contacts the surface of said reference body,
    turning one of said reference body and said pick-up back and forth over a limited range about said datum axis to establish the relative angular position of said pick-up and said reference body corresponding to a turning point of the output signal from said pick-up, and
    further adjusting the radial position of said pick-up while continuing to effect back and forth turning movement of one of said pick-up and said reference body, to adjust the value of the pick-up output signal at said turning point to a selected value.

2. The method of claim 1, wherein said further adjustment of the radial position of said pick-up adjusts said pick-up output signal to the same value as that upon centering of the reference body.

3. The method of claim 1, which comprises the step of displaying the output signal from the pick-up on a chart, and in which said further adjustment to the radial position of said pick-up moves the chart display line to a preselected position on said chart.

4. The method of claim 1, which comprises the step of utilizing as said reference body a body which has a closed semi-cylindrical surface and a flat surface and in which said adjustment to the radial position of said reference body moves said reference body to a position where said pick-up can be brought into contact with the flat face thereof.

5. The method of claim 1, which comprises the step of utilizing as said reference body a body which has a closed semi-cylindrical surface and in which said adjustment to the radial position of said reference body moves said reference body to a position where said pick-up can be brought into contact with the semi-cylindrical surface thereof.

6. A method of setting the pick-up of an instrument of the type comprising:
    a workpiece support table,
    an X-Y coordinate table mounted on the workpiece support table,
    a pick-up on a pick-up support mounted with respect to said workpiece support table such that at least one of said pick-up and said workpiece support table are rotatable about a fixed datum axis of the instrument, and
    means for measuring displacements of said X-Y coordinate table with respect to said workpiece support table,
    whereby to position said pick-up at a selected radial position, said method comprising the steps of:
    locating on said X-Y coordinate table a reference body having an at least partly cylindrical surface,
    rotating one of said pick-up and said workpiece table about said datum axis with said pick-up in contact with the surface of said reference body,
    feeding the output from said pick-up to a computer which calculates from it the radius of the least squares reference circle as said pick-up and said workpiece are relatively rotated, storing a signal representing said radius and computing from it the required displacement of said pick-up to set it to said selected radial position,
    adjusting said X-Y coordinate table to move said reference body away from said datum axis by said required displacement,
    adjusting the radial position of said pick-up until it contacts the surface of said reference body,
    turning one of said reference body and said pick-up back and forth about said datum axis over a limited range to establish the relative angular position of said pick-up and said reference body corresponding to a turning point of the output signal from said pick-up, and
    further adjusting the radial position of said pick-up while continuing to effect back and forth turning movement of one of said pick-up and said reference body, to adjust the value of the pick-up output signal at said turning point to a selected value which is determined by said computer.

7. A method of determining the radius of a component the nominal radius of which is known using an instrument of the type comprising:
    a workpiece support table,
    a pick-up on a pick-up support mounted with respect to said workpiece support table such that at least one of said pick-up and said workpiece support table are rotatable about a datum axis of the instrument,
    an X-Y coordinate table carried by said workpiece support table, and
    means for measuring displacements of said X-Y coordinate table with respect to said workpiece support table,
    which method comprises the steps of utilizing the method of claim 1 to set the radial position of the pick-up to said nominal radius, substituting the component under test for said reference body, traversing said pick-up in contact with the component under test and determining the difference in the mean value of the output signal from the pick-up during the traverse of the component under test from selected value thereof to provide an indication of the mean value of the radius of the component under test.

8. The method of claim 7, which comprises the steps of displaying said pick-up output signal on a graduated chart during the traverse thereof around the component under test, and using the reading on said chart to establish the radius of the component under test.

9. A method of determining the radius of a component the nominal radius of which is known using an instrument of the type comprising:

a workpiece support table, a pick-up on a pick-up support mounted with respect to said workpiece support table such that at least one of said pick-up and said workpiece support table is rotatable about a datum axis of the instrument, an X-Y coordinate table carried by said workpiece support table, and means for measuring displacements of said X-Y coordinate table with respect to said workpiece support table, which method comprises the steps of utilizing the method of claim 6 to set the radial position of the pick-up to said nominal radius by substituting the component under test for said reference body, traversing said pick-up in contact with the component under test and determining the difference in the mean value of the output signal from the pick-up during the traverse of the component under test from said selected value thereof to provide an indication of the mean value of the radius of the component under test.

* * * * *